United States Patent
Turner et al.

(10) Patent No.: US 10,113,559 B2
(45) Date of Patent: Oct. 30, 2018

(54) GAS TURBINE ENGINE IMPACT LINER

(71) Applicant: UNITED TECHNOLOGIES CORPORATION, Farmington, CT (US)

(72) Inventors: Matthew A. Turner, Wallingford, CT (US); Colin J. Kling, Middletown, CT (US); David A. Topol, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 408 days.

(21) Appl. No.: 14/850,438

(22) Filed: Sep. 10, 2015

(65) Prior Publication Data

US 2016/0281737 A1     Sep. 29, 2016

Related U.S. Application Data

(60) Provisional application No. 62/063,451, filed on Oct. 14, 2014.

(51) Int. Cl.
*F04D 29/52*     (2006.01)
*F01D 21/04*     (2006.01)
(Continued)

(52) U.S. Cl.
CPC ............ *F04D 29/526* (2013.01); *F01D 5/02* (2013.01); *F01D 21/045* (2013.01); *F02C 3/04* (2013.01); *F02C 7/045* (2013.01); *F04D 29/321* (2013.01); *F04D 29/325* (2013.01); *F05D 2220/32* (2013.01); *F05D 2220/36* (2013.01); *F05D 2230/23* (2013.01); *F05D 2230/30* (2013.01); *F05D 2240/35* (2013.01); *F05D 2300/17* (2013.01); *F05D 2300/43* (2013.01); *Y02T 50/671* (2013.01)

(58) Field of Classification Search
CPC .... F04D 29/256; F04D 29/321; F04D 29/325; F04D 28/526; F04D 29/526; F01D 5/02; F01D 21/045; F01D 25/24; F02C 7/045; F23R 3/002
See application file for complete search history.

(56) References Cited

U.S. PATENT DOCUMENTS 5,408,826 A * 4/1995 Stewart ................ F01D 21/045
                                                                    415/9
5,413,456 A * 5/1995 Kulak ................... F01D 21/045
                                                                    415/200
(Continued)

FOREIGN PATENT DOCUMENTS

EP     0626502 B1    11/1994
EP     0965731 A2    12/1999
(Continued)

OTHER PUBLICATIONS

European Search Report for Application No. 15189627.1-1607; dated Mar. 10, 2016, 7 pgs.

*Primary Examiner* — Craig Kim
(74) *Attorney, Agent, or Firm* — Cantor Colburn LLP

(57) ABSTRACT

A gas turbine engine impact liner is disclosed. The impact liner may include a base sheet, a plurality of stanchions extending from the base sheet, and a plurality of supports, each being operatively associated with one of the plurality of stanchions.

16 Claims, 14 Drawing Sheets

(51) Int. Cl.
    *F02C 7/045*     (2006.01)
    *F01D 5/02*     (2006.01)
    *F02C 3/04*     (2006.01)
    *F04D 29/32*     (2006.01)

(56) References Cited

U.S. PATENT DOCUMENTS

| | | | | |
|---|---|---|---|---|
| 6,223,538 | B1* | 5/2001 | Benz | F23M 5/02 |
| | | | | 60/753 |
| 8,453,455 | B2* | 6/2013 | Bastnagel | F23M 5/04 |
| | | | | 60/752 |
| 2011/0016869 | A1* | 1/2011 | Iwasaki | F23R 3/002 |
| | | | | 60/752 |
| 2011/0244150 | A1* | 10/2011 | Thrash | B64D 29/00 |
| | | | | 428/34.1 |
| 2013/0336761 | A1* | 12/2013 | Evans | F01D 21/045 |
| | | | | 415/9 |
| 2014/0227076 | A1* | 8/2014 | Hoyland | F02C 7/04 |
| | | | | 415/9 |
| 2015/0159508 | A1* | 6/2015 | Robertson, Jr. | F01D 25/24 |
| | | | | 415/200 |

FOREIGN PATENT DOCUMENTS

| | | | |
|---|---|---|---|
| EP | 2071132 | A2 | 6/2009 |
| EP | 2767676 | A1 | 8/2014 |

* cited by examiner

GAS TURBINE ENGINE IMPACT LINER

CROSS REFERENCE TO RELATED APPLICATIONS

This application is a non-provisional application claiming the 35 U.S.C. § 119(e) benefit of U.S. Provisional Patent Application No. 62/063,451 filed on Oct. 14, 2014.

FIELD OF THE DISCLOSURE

This disclosure generally relates to gas turbine engines and, more specifically, relates to impact liners for gas turbine engines.

BACKGROUND OF THE DISCLOSURE

Gas turbine engines are well known internal combustion engines typically used to provide thrust to an aircraft or to provide power for land-based operations. Generally speaking, a gas turbine engine includes a fan, a compressor, a combustor and a turbine arranged in a serial fashion. The fan draws in ambient air as it rotates and moves it to the compressor where the air is compressed or pressurized. The compressed air is then communicated to the combustor where it is mixed with fuel and ignited. The products of the combustion are hot gases which are then directed into the turbine. This causes the airfoils in the turbine to rotate, and as turbine is mounted on the same shaft, or shafts, as the compressor and fan, this causes the compressor and fan to rotate as well. Accordingly, once started, it can be seen that the operation of the engine is self-sustaining in that the combustion of more fuel causes more rotation of the turbine and in turn the compressor and the fan. Moreover, the rotation of the fan, which typically has a diameter many times that of the compressor and the turbine, causes the engine to generate thrust.

During operation, ice can form and build-up on fan blades and their roots, such as when an aircraft is in a holding pattern and the blades are rotating at a relatively low speed. Then, when the aircraft is given clearance to leave the pattern, the subsequent acceleration of the engine may cause the ice to peel away from the blades and roots and hurl into the fan casing, thereby causing denting, or other damage, that leads to decreased operational efficiency in the engine. To alleviate such operational efficiency issues, engine manufacturers ordinarily place impact liners inside the fan casing that absorb the energy of impacting material. These impact liners can then be replaced so that the efficiency of the engine can be maintained.

In addition to issues with ice, gas turbine engine designers also face increasing pressure to further attenuate noise, such as fan tones and fan broadband, heard on approach/takeoff from airports and by passengers inside the cabin during flight. To lessen such noise, engine designers customarily place acoustic panels aft the impact liners discussed above. While effective and widely used, a problem with the aforementioned impact liners is that they ordinarily do not attenuate noise, and therefore take up space that could be used for placement of additional acoustic panels to help lessen such engine noise.

Thus, while certain gas turbine engine impact panels are known, improvements to impact liners in the area of noise attenuation, while maintaining resilience to ice damage, is desired.

SUMMARY OF THE DISCLOSURE

In accordance with one aspect of the present disclosure, an impact liner is disclosed. The impact liner may include a base sheet and a plurality of stanchions extending from the base sheet. The impact liner may additionally include a plurality of supports, and each of the supports may be operatively associated with one on the plurality of the stanchions.

In a refinement of the impact liner, the supports may further include a chamber.

In another refinement of the impact liner, the supports may further include a plurality of trusses extending from an inner wall.

In another refinement of the impact liner, the supports may additionally include nodes.

In another refinement of the impact liner, the supports may further include nodes and the trusses may meet at the nodes.

In another refinement of the impact liner, the supports may sit on the stanchions at the nodes.

In another refinement of the impact liner, the trusses may meet at the nodes, and the supports may sit on the stanchions at the nodes.

In another refinement of the impact liner, the impact liner may further include a perforated sheet sitting on the plurality of supports.

In accordance with another aspect of the present disclosure, a gas turbine engine is disclosed. The gas turbine engine may include a compressor section, a combustor section downstream of the compressor section, a turbine section downstream of the combustor section and a fan section upstream of the compressor section. The compressor section may include an impact liner, and the impact liner may include a base sheet and a plurality of stanchions extending from the base sheet. The impact liner may additionally include a plurality of supports, and each of the supports may be operatively associated with one on the plurality of the stanchions.

In a refinement of the gas turbine engine, the supports may further include a chamber.

In another refinement of the gas turbine engine, the supports may further include a plurality of trusses extending from an inner wall.

In another refinement of the gas turbine engine, the supports may additionally include nodes.

In another refinement of the gas turbine engine, the supports may further include nodes and the trusses may meet at the nodes.

In another refinement of the gas turbine engine, the supports may sit on the stanchions at the nodes.

In another refinement of the gas turbine engine, the trusses may meet at the nodes, and the supports may sit on the stanchions at the nodes.

In another refinement of the gas turbine engine, the impact liner may further include a perforated sheet sitting on the plurality of supports.

In accordance with another aspect of the present disclosure, a method of making an impact liner is disclosed. The method may include a first step of injection molding a stanchion-support combination, the stanchion-support combination having a first and second surface. Then, a base sheet may be adhered to the first surface. Next, a perforated sheet may be adhered to the second surface.

In a refinement of the method of making an impact liner, the stanchion-support combination may be comprised of thermoplastic.

In another refinement of the method of making an impact liner, the base sheet may be comprised of metal or metal alloy.

In another refinement of the method of making an impact liner, the perforated sheet may be comprised of metal or metal alloy

These and other aspects and features of the present disclosure will be more readily understood when read in conjunction with the accompanying drawings.

DETAILED DESCRIPTION OF THE DISCLOSURE

Figure 1:
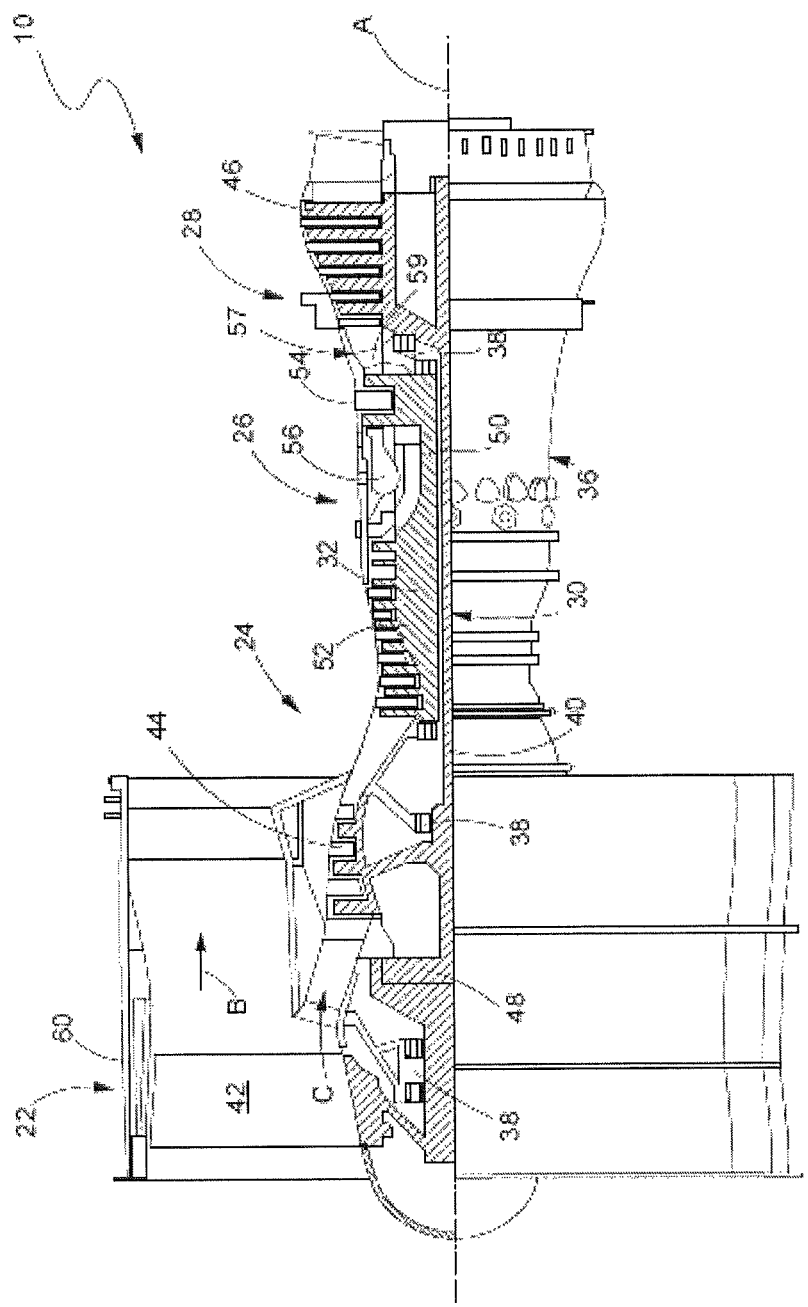
FIG. 1 is a side, partially cross-sectional view of a gas turbine engine constructed in accordance with the present disclosure.

Referring now to the drawings, and with specific reference to FIG. 1, a gas turbine engine is shown and generally referred to be reference numeral 20. The gas turbine engine 20 disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B, while the compressor section 24 drives air along a core flowpath C for compression and communication into the combustor section 26. As will be described in further detail herein, in the combustion section 26, the compressor air is mixed with fuel and ignited, with the resulting combustion gases then expanding in turbine section 28. Although depicted as a turbofan gas turbine engine in the disclosed non-limiting embodiment, it should be understood that the concepts described herein are not limited to use with turbofans as the teachings may be applied to other types of turbine engines including, but not limited to, three-spool architectures as well.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan blade assembly 42, a low pressure (or first) compressor section 44 and a low pressure (or first) turbine section 46. The inner shaft 40 is connected to the fan blade assembly 42 through a geared architecture 48 to drive the fan assembly 42 at a lower speed than the low speed spool 30. The high speed spool 32 includes an outer shaft 50 that interconnects a high pressure (or second) compressor section 52 and high pressure (or second) turbine section 54. The outer shaft 50 is typically concentric with and radially outward from the inner shaft 50. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed first by the low pressure compressor 44, and then by the high pressure compressor 52, before being mixed and burned with fuel in the combustor 56, and lastly expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a high-bypass engine a greater volume of air moves along a bypass flowpath B than through core airflow C. The ratio of the mass of air moving through bypass flowpath B to core airflow C is known as the bypass ratio. In a one example, the engine 20 bypass ratio may be greater than about six (6), while in another example the bypass ratio may be greater than ten (10), the geared architecture 48 may be an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1.

Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

Figure 2:
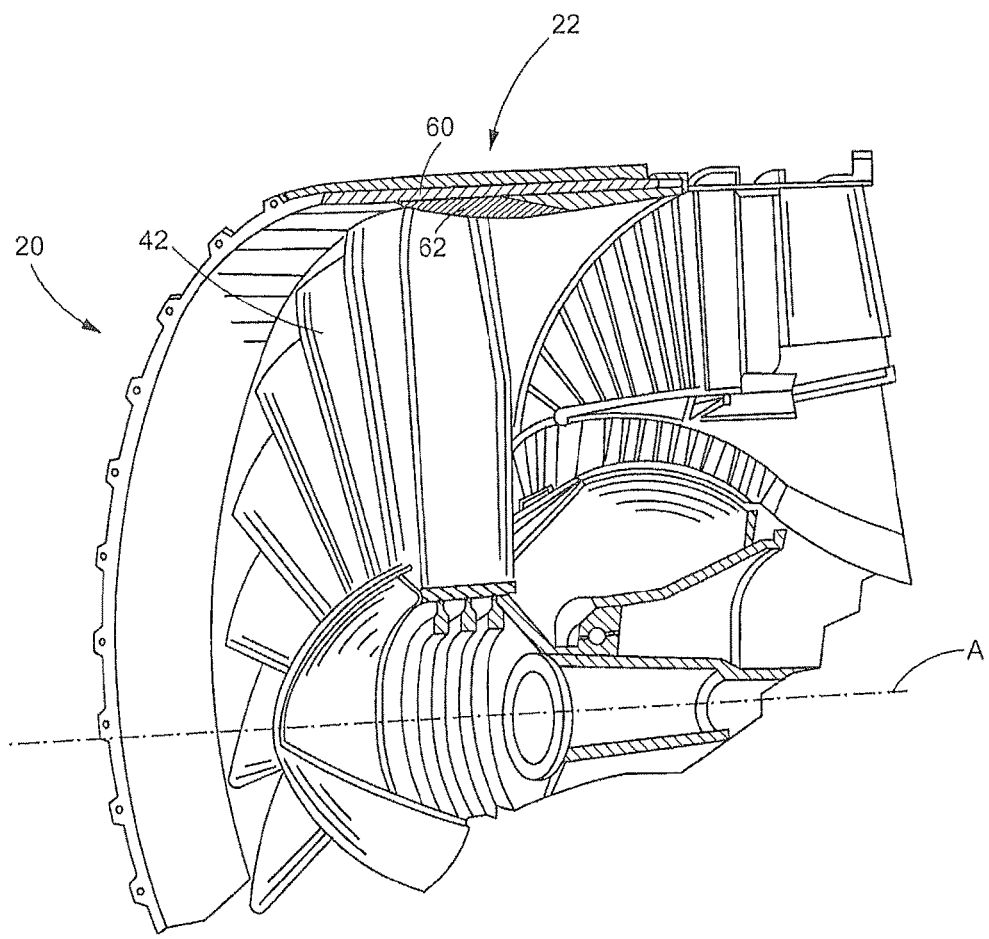
FIG. 2 is a side, cut-away view of the fan section of the engine of FIG. 1 including an impact liner manufactured in accordance with the present disclosure.

Now turning to FIGS. 1-2, the fan section 22 may further include a casing 60 that extends forward from the fan blade assembly 42 and rearwards towards the compressor section 24. The fan section may also include an impact liner 62 constructed in accordance with the present disclosure.

Figure 3:
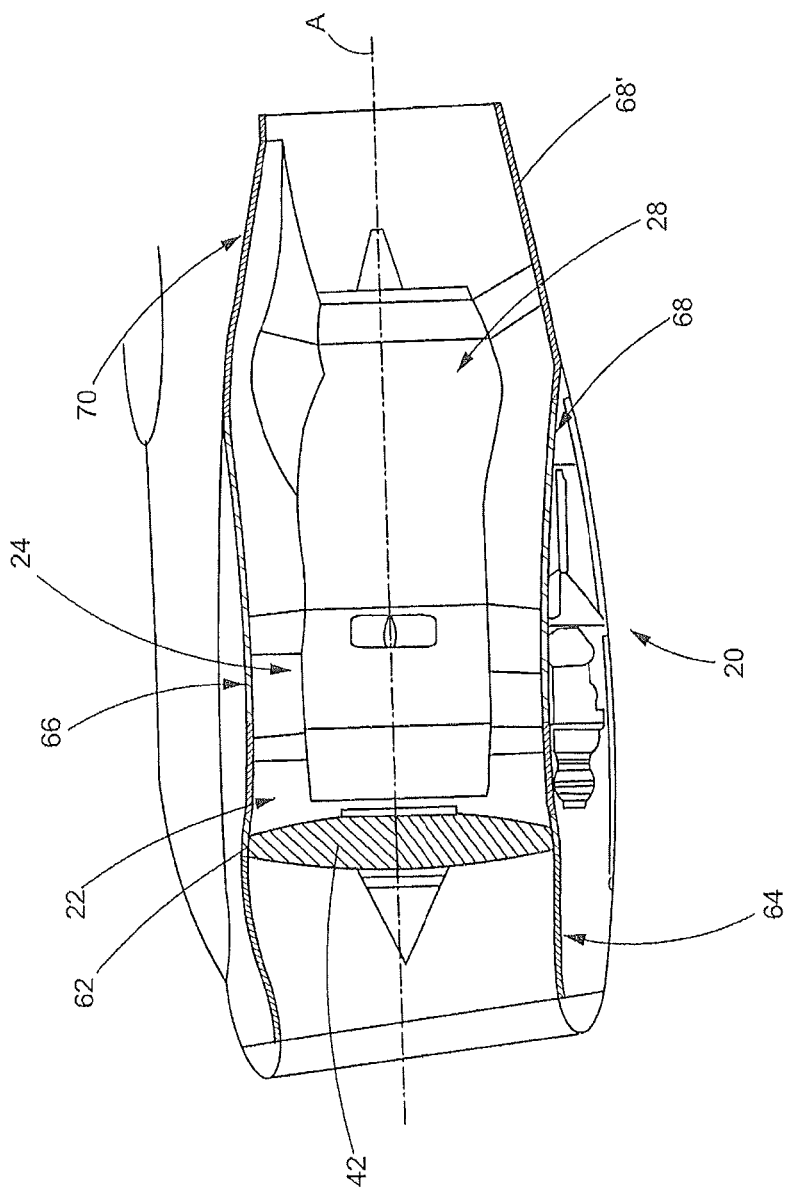
FIG. 3 is a side view of a gas turbine engine with the nacelle partially cut-away to demonstrate alternate locations where an impact liner manufactured in accordance with the present disclosure may be placed.

The casing 60 may generally be cylindrical in shape and surround the fan blade assembly 42. The impact liner 62 may also be generally cylindrical in shape and may coaxially surround the fan blade assembly 42, but may be located radially inward of the casing 60. Impact liner 62 may be positioned along axis A such that it lies in a plane containing the fan blade assembly 42. Alternatively, and now with reference to FIG. 3, the impact liner 62 may also be positioned along axis A such that it is located in the inlet 64 positioned upstream of the fan blade assembly 42. Furthermore, there are no limitations on the location of an impact liner 62 manufactured in accordance with the present disclosure. Thus, the impact liner (66, 68, and 68') may additionally be positioned in the compressor section 24, turbine section 28 and even the exit section 70 of the engine, respectively.

Figure 4:
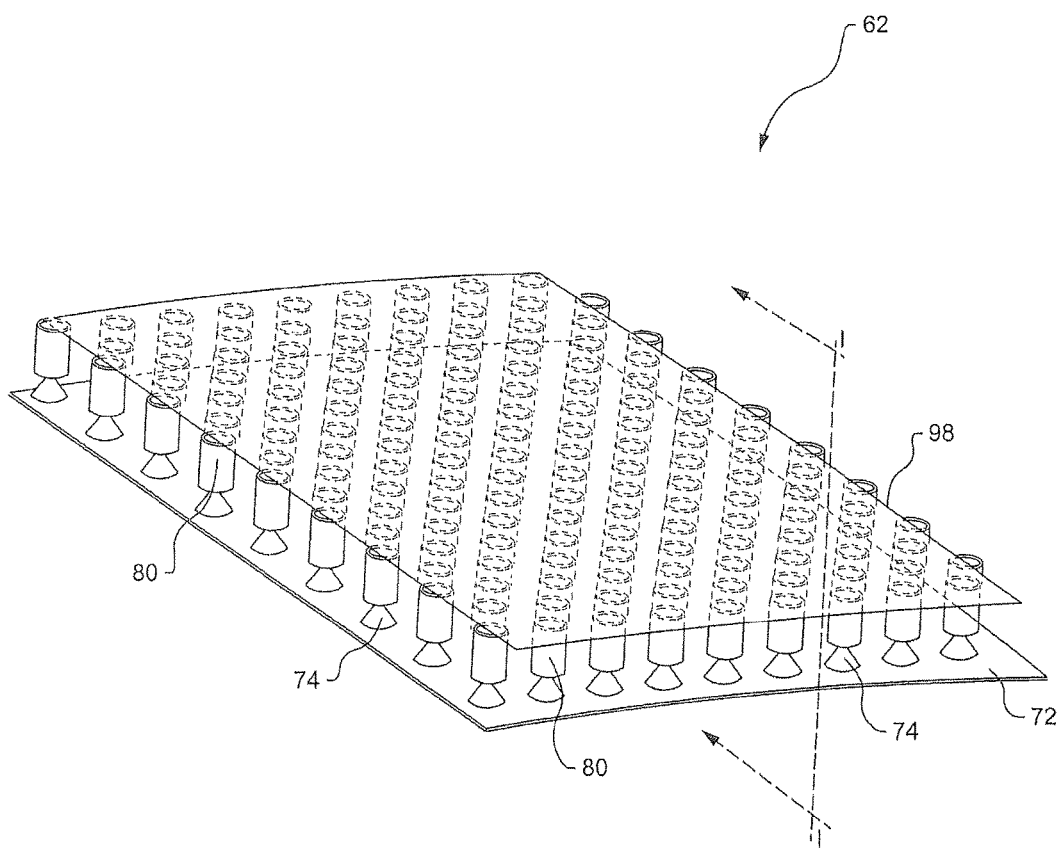
FIG. 4 is a perspective view of an impact liner manufactured in accordance with present disclosure.
Figure 5:
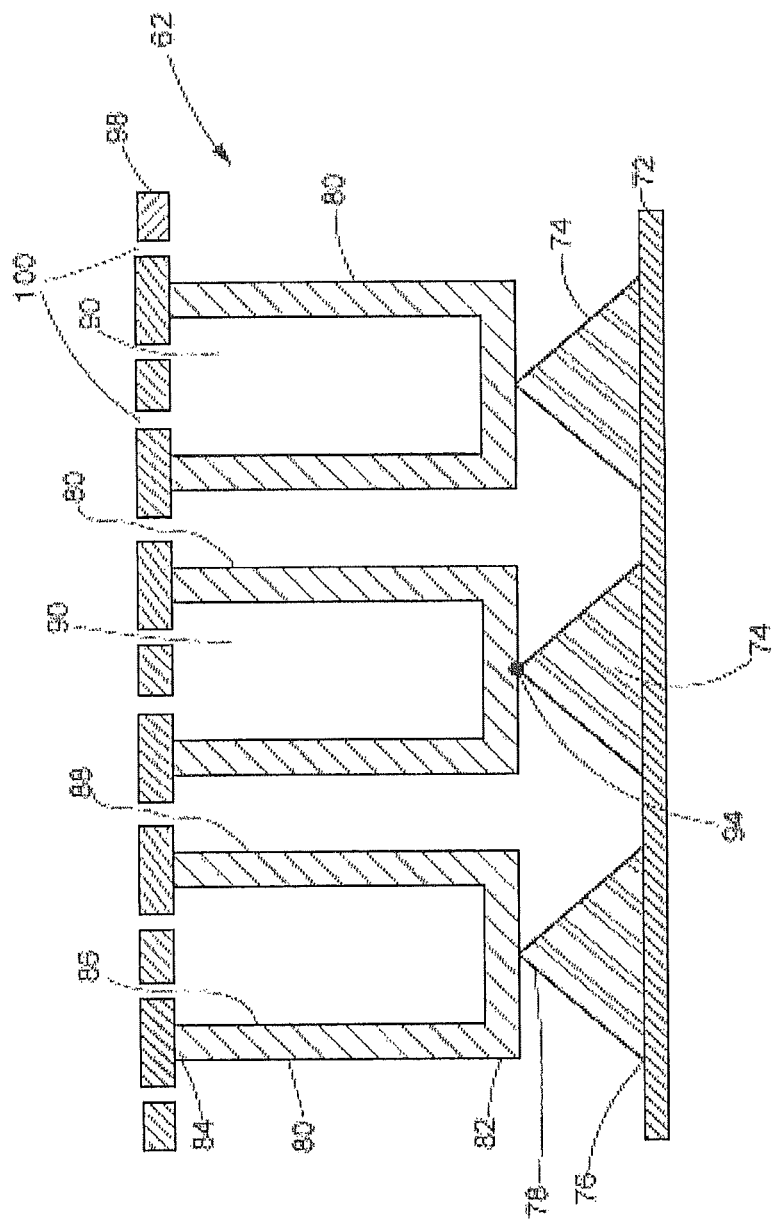
FIG. 5 is a cross-sectional view of an impact liner manufactured in accordance with the present disclosure in the direction of I-I of FIG. 4.
Figure 6A:
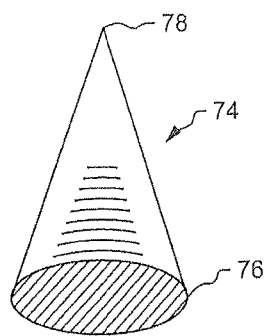
FIGS. 6a-6h are schematic illustrations depicting three-dimensional geometries that a stanchion of an impact liner manufactured in accordance with the present disclosure may utilize.
Figure 6B:
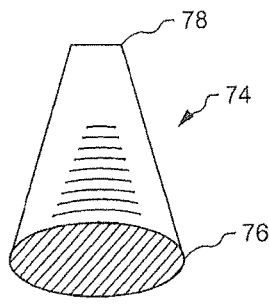
Figure 6C:
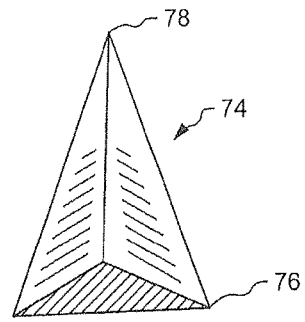
Figure 6D:
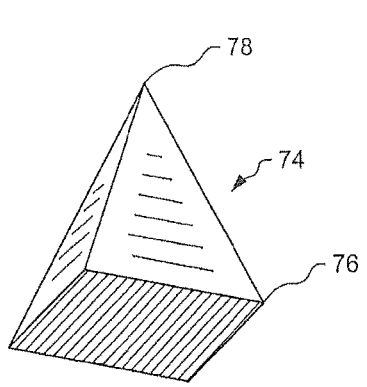
Figure 6E:
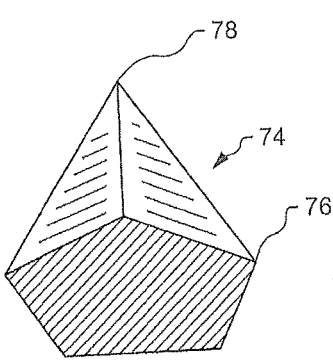
Figure 6F:
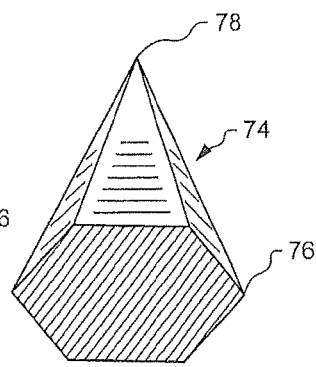
Figure 6G:
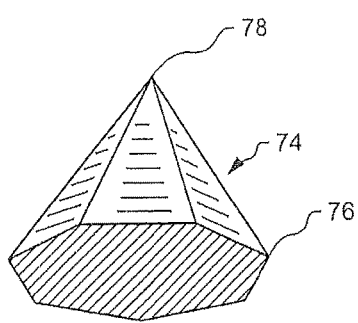
Figure 6H:
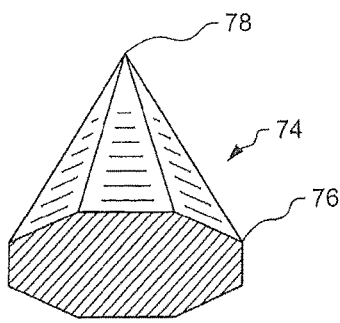

Turning now to FIGS. 4-5, the impact liner may include a base sheet 72. The base sheet 72 may be impervious and manufactured from a thermoplastic material, a metal or even a metal alloy. The thermoplastics from which the base sheet 72 may be comprised include, but are not limited to, acrylic, nylon, polybenzimidazole, polyethylene, polypropylene, polystyrene, polyvinyl chloride, polytetrafluoroethylene and combinations thereof. While the following list is not meant to be exhaustive, the metals from which the base sheet 72 may be comprised include aluminum, titanium and nickel. Some examples of metal alloys from which base sheet 72 may be made include aluminum alloys, steel, nickel alloys and titanium alloys, such as series 2000, 6000 or 7000 aluminum, 300 and 400 series stainless steels, precipitation hardenable stainless steels, Ti-6Al-4V, Ti-6Al-2Sn-4Zr-2Mo, WASPALOY®, INCONEL 718®, INCONEL 718+®, INCONEL 939® or HAYNES 282®.

A plurality of stanchions 74 may extend from the base sheet 72. The stanchions 74 have first sides 76 and second sides 78 having a length therebetween, and the first sides may be positioned more closely to the base sheet 72 than the second sides. The stanchions 74, like the base sheet 72, may also be made of a metal or a thermoplastic. The metals from which the stanchions 74 may be made include aluminum, titanium and nickel. The thermoplastics from which the stanchions 74 may be made comprise acrylic, nylon, polybenzimidazole, polyethylene, polypropylene, polystyrene, polyvinyl chloride, polytetrafluoroethylene and combinations thereof. Furthermore, the stanchions 74 may be made of metal alloys such as aluminum alloys, steel, nickel alloys and titanium alloys. Examples of these alloys include series 2000, 6000 or 7000 aluminum, 300 and 400 series stainless steels, precipitation hardenable stainless steels, Ti-6Al-4V, Ti-6Al-2Sn-4Zr-2Mo, WASPALOY®, INCONEL 718®, INCONEL 718+®, INCONEL 939® or HAYNES 282®.

The stanchions 74 may be made as part of the base sheet 72 or be manufactured separately therefrom. In the instance that stanchions 74 are manufactured separately from the base sheet 72, the first sides 76 of the stanchions may be adhesively or metallurgically bonded to the base sheet. The adhesives that may be used to bond the stanchions 74 to the base sheet 72 in this instance may include epoxy resins. Epoxy resins that may be used to adhere the stanchions 74 to the base sheet 72 includes bisphenol A resins, bisphenol F resins, novolac resins, aliphatic epoxy resins and glycidylamine resins. Alternatively, if the stanchion 74 is manufactured from thermoplastic, then it may be adhered to the base sheet 72 by thermal melting. In thermal melting a heat source is applied to the base sheet 72. Then, the thermoplastic formed stanchion 74 may be contacted with the heated base sheet 72. The base sheet 72 transfers heat energy to the thermoplastic stanchion 74 thereby raising its temperature to at least to the melting temperature of the thermoplastic material and bonds form between the base sheet and the stanchion 74. Then upon cooling, the stanchion 74 is bonded and adhered to the base sheet 72.

Referring now to FIGS. 5-6, the first sides 76 of the stanchions 74 generally have a planar cross-section. Furthermore, the stanchions 74 generally move towards a point when moving between the first side 76 and the second side 78 to obtain a conical three-dimensional shape. However, as is demonstrated in FIGS. 6a-h, this is not the only shape that the stanchions 74 may take. As shown there, the stanchions may have a conical shape as already discussed (6a). Furthermore, the stanchion 74 may converge towards a second planar cross-section at the second side 78 as shown in the frustoconical depiction of 6b. Other three-dimensional shapes that stanchions may have include triangular pyramidal (6c), square pyramidal (6d), pentagonal pyramidal (6e), hexagonal pyramidal (6f), heptagonal pyramidal (6g), octagonal pyramidal (6h) and combinations thereof.

Returning now to FIGS. 4-5, the impact liner 62 may further include a plurality of supports 80. The supports 80 may have first ends 82 and seconds ends 84 defining a length therebetween, and the first ends may be positioned more closely to the stanchions 74 than the second ends. Like the base sheet 72 and stanchions 74 described above, the supports 80 may be made of metals, metal alloys and thermoplastic materials. Like the above, the supports 80 may be made of aluminum, titanium and nickel metals. Additionally, the metal alloys from which the supports 80 may be made include aluminum alloys, steel, nickel alloys and titanium alloys, such as series 2000, 6000 or 7000 aluminum, 300 and 400 series stainless steels, precipitation hardenable stainless steels, Ti-6Al-4V, Ti-6Al-2Sn-4Zr-2Mo, WASPALOY®, INCONEL 718®, INCONEL 718+®, INCONEL 939® or HAYNES 282®. Finally, the thermoplastics from which the supports 80 may be made include, but are not meant to be limited to, acrylic, nylon, polybenzimidazole, polyethylene, polypropylene, polystyrene, polyvinyl chloride, polytetrafluoroethylene and combinations thereof.

Figure 7A:
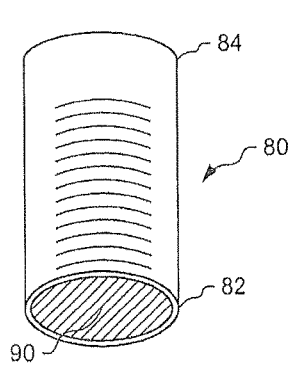
FIGS. 7a-7i are schematic illustrations depicting cross sectional shapes that a chamber of the support of an impact liner manufactured in accordance with the present disclosure may utilize.
Figure 7B:
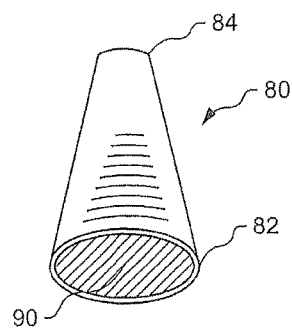
Figure 7C:
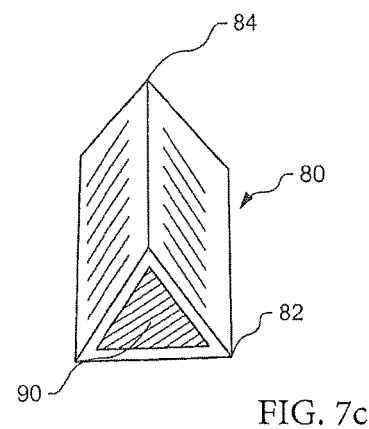
Figure 7D:
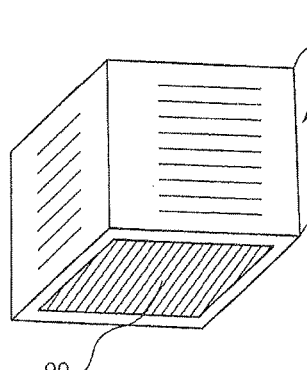
Figure 7E:
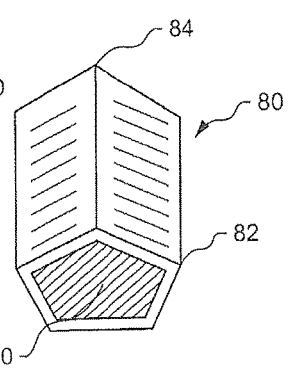
Figure 7F:
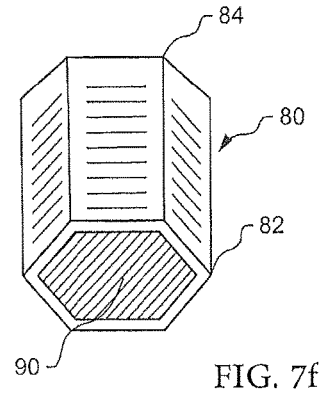
Figure 7G:
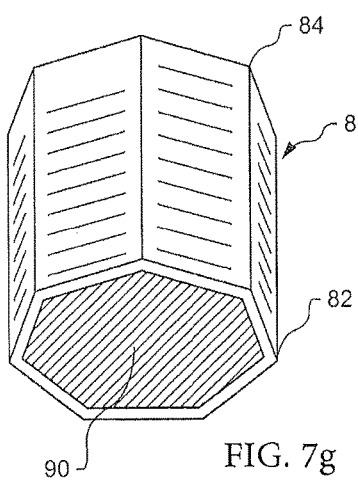
Figure 7H:
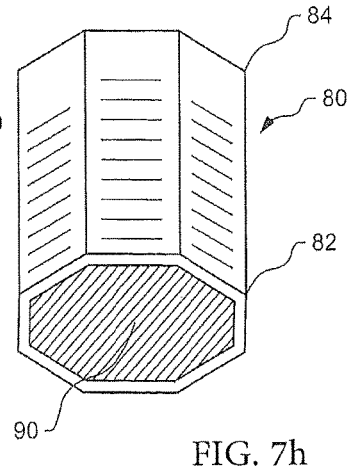
Figure 7I:
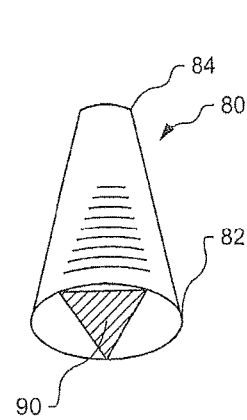

The supports may further include an inner wall 86 and an outer wall 88, and further define interior chambers 90. The chambers 90 may act as Helmholtz resonators that attenuate sound passing by such chambers. As is depicted in FIG. 7a, it can be seen that the chambers 90 may have a generally circular cross-section at both the first ends 82 and second ends 84. Yet, as is demonstrated in FIGS. 7a-i, this is not the only geometry that the chamber 90 may take. As is shown there, in addition to the generally circular cross section of FIG. 7a, the chambers 90 may take on frustoconical cross-sections (7b), trigonal cross-sections (7c), rectangular cross-sections (7d), pentagonal cross-sections (7e), hexagonal cross-sections (7f), heptagonal cross-sections (7g), octagonal cross-sections (7h) and combinations thereof. Like the cylindrical example (7a), the first ends 82 and second ends 84 of each of these additional geometries (7b-7h) has the same cross-sectional shapes. However, as will be understood by a person of skill in the art, this is not always necessary and will be based on the designs necessary to abate sound. Thus, a chamber 90 may have a first cross-sectional shape at the first end 82 and a second cross-sectional shape at the second end 84. Furthermore, it will be understood that the cross-section of the chamber 90 may respectively be shaped so that it correlates with the shape of the stanchion 74 with which it is associated. However, this may not always be necessary and may instead be dependent upon a combination of stanchion 74 shape and chamber 90 cross-section that best attenuates sound for a particular design or location of an impact liner 62 manufactured in accordance with present disclosure. Furthermore, as is depicted in FIG. 7i, the chamber 90 and the outer wall 88 of the support 80 may not have the same cross-sectional shape. As is demonstrated there, in one instance the chamber 90 may have a triangular cross-sectional shape and while the outer wall 88 of the support 80 may have a generally circular cross-sectional shape. As would be understood, other cross-sectional shape combinations between the chamber 90 and outer wall 88 may be possible and based on design considerations necessary for the abatement of sound or location of the liner 62 in the engine 20.

Figure 8:
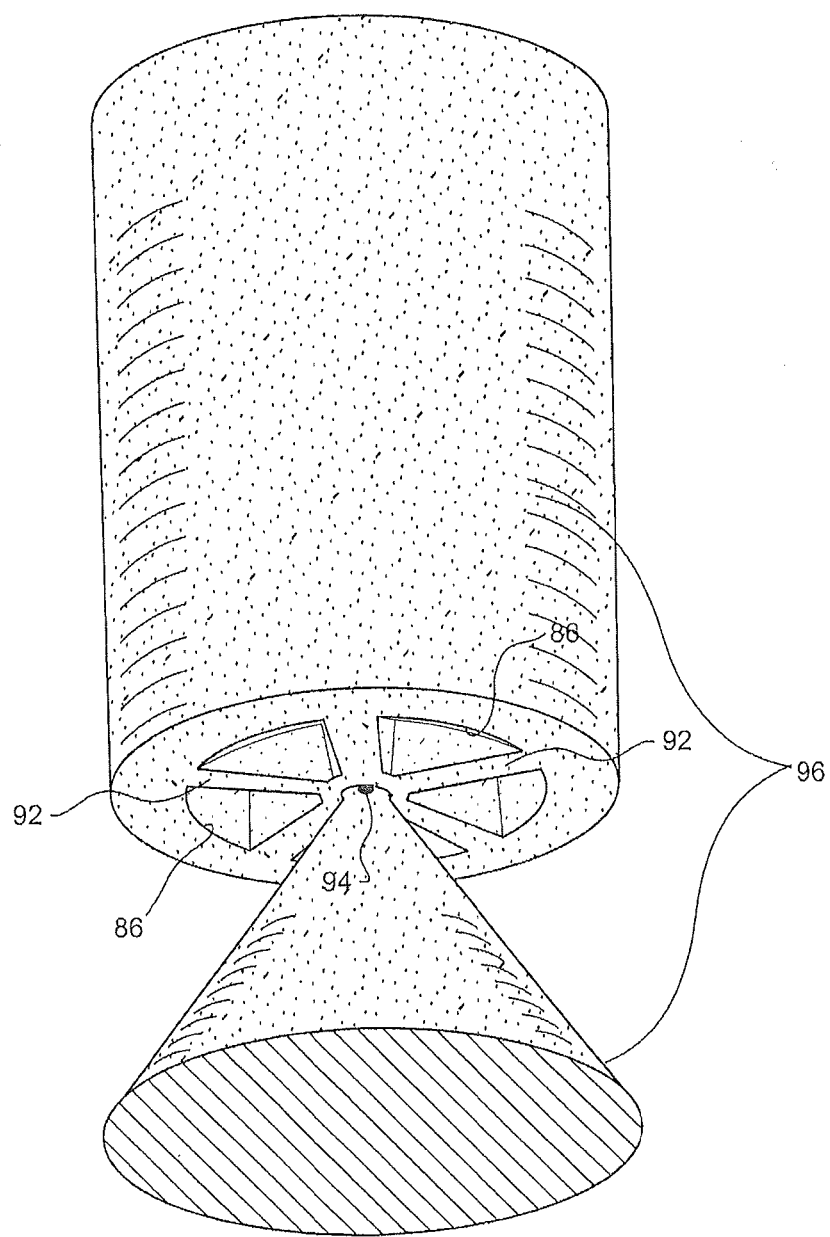
FIG. 8 is a perspective view of a stanchion and support disclosed in FIG. 5 displaying additional features of an impact liner manufactured in accordance with the present disclosure.
Figure 9:
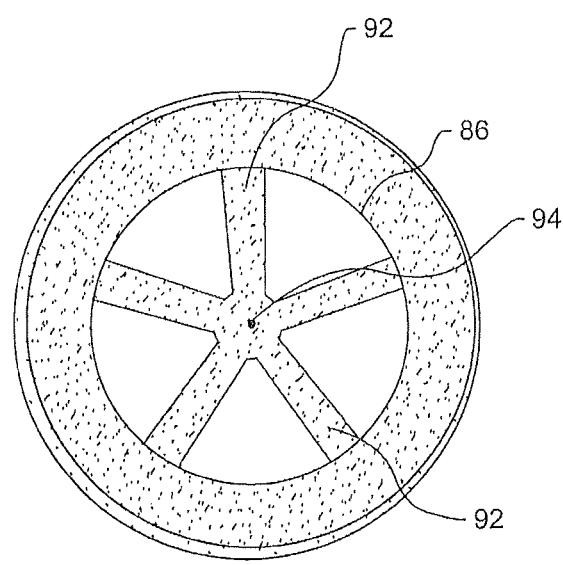
FIG. 9 is an end view of the support disclosed in FIGS. 5 and 8 displaying additional features of an impact liner manufactured in accordance with the present disclosure.

Furthermore, the supports 80 may additionally include a plurality of trusses 92 that extend from the inner wall 86 and meet at a node 94 as depicted in FIGS. 8-9. The trusses 92 and nodes 94 may be made of metals, metal alloys and thermoplastic materials. Like the supports 80, the trusses 92 and nodes 94 may be made of aluminum, titanium and nickel metals. Additionally, the metal alloys from which the trusses 92 and nodes 94 may be made include aluminum alloys, steel, nickel alloys and titanium alloys, such as series 2000, 6000 or 7000 aluminum, 300 and 400 series stainless steels, precipitation hardenable stainless steels, Ti-6Al-4V, Ti-6Al-2Sn-4Zr-2Mo, WASPALOY®, INCONEL 718®, INCONEL 718+®, INCONEL 939® or HAYNES 282®. Finally, the thermoplastics from which the trusses 92 and nodes 94 may be made include, but are not meant to be limited to, acrylic, nylon, polybenzimidazole, polyethylene, polypropylene, polystyrene, polyvinyl chloride, polytetrafluoroethylene and combinations thereof.

Looking now to FIGS. 5 and 8, the supports 80 may be operatively associated with the stanchions 74 at the nodes 94. More specifically, the node 94 of one of the plurality of supports 80 may be coupled to the second side 78 of the stanchion 74 with which it is associated. In one instance, the supports 80, and its attendant trusses 92 and node 94, may be manufactured as one piece with a respective stanchion 74 to form a stanchion-support combination 96. This stanchion-support combination 96 may be manufactured by, for example, injection molding of a thermoplastic material or casting of a metal or metal alloy.

Alternatively, the support 80, and its attendant trusses 92 and node 94, may be manufactured separately from the stanchion 74 with which it is associated. In this instance, the support 80 may be adhered to the second side 78 of stanchion 74 at the node 94. The adhesives that may be used to bond the support 80 to the stanchion 74 in this instance include epoxy resins, including but not limited to, includes bisphenol A resins, bisphenol F resins, novolac resins, aliphatic epoxy resins and glycidylamine resins. Additionally, if the support 80, and its trusses 92 and node 94, is manufactured from thermoplastic, then it may be adhered to the stanchion 74 by thermal melting in a process analogous to the thermal melting technique described above to attach a stanchion 74 to a base sheet 72.

Figure 10A:
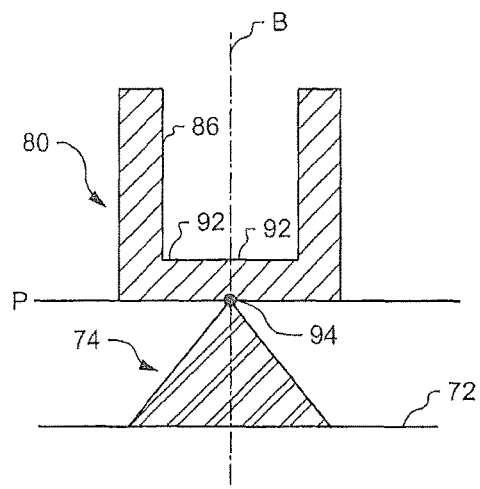
FIGS. 10a-10c are side, cross-sectional views displaying initial node locations along a central axis of a support that an impact liner manufactured in accordance with the present disclosure may utilize.
Figure 10B:
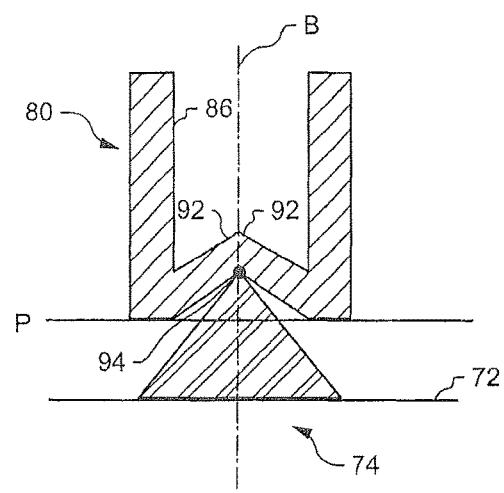
Figure 10C:
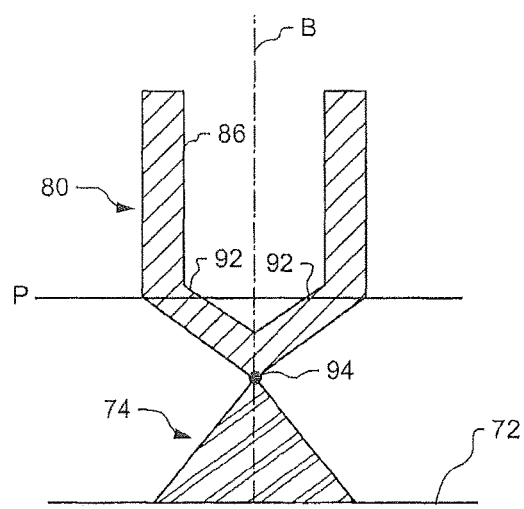

Design considerations may impact where the node 94 of the support 80 is located. Thus, as is depicted in FIG. 10, the node 94 may be located at different points along a central axis B of the support 80. For example, and as is depicted in FIG. 10a, in one instance the node 94 may be positioned along the central axis B at a point in a plane P from which the trusses 92 extend from the inner wall 86. Yet, in another instance, less compression length may be needed for a particular combination of base sheet 72, stanchions 74 and support 80. Thus, as is depicted in FIG. 10b, in this instance the node 94 may be positioned along the central axis B at a point further away from the base sheet 72 than the plane P from which the trusses 92 extend from the inner wall 86. Furthermore, in another design, more compression length may be needed for a particular combination of base sheet 72, stanchions 74 and support 80. Thus, in this plan, the node 94 may be positioned along the central axis B at a point closer to the base sheet 72 than a plane P from which the trusses 92 extend from the inner wall 86 as is depicted in FIG. 10c. Lastly, not all nodes 94 of an impact liner 62 disclosed herein need to be positioned at the same location along the axes B of the supports 80. Thus, in some instances is may be advantageous to mix the location of the node 94 in one support 80 in comparison to the node in a different support of an impact liner 62 manufactured in accordance with the present disclosure.

Now turning back to FIGS. 4-5, the impact liner 62 disclosed herein may further include a perforated sheet 98. The perforated sheet 98 may further include a plurality of openings 100 therethrough and be manufactured from a thermoplastic material, a metal or a metal alloy. The thermoplastics from which the perforated sheet 98 may be made include, but are not limited to, acrylic, nylon, polybenzimidazole, polyethylene, polypropylene, polystyrene, polyvinyl chloride, polytetrafluoroethylene and combinations thereof. While the following list is not meant to be exhaustive, the metals from which the perforated sheet 98 may be comprised include aluminum, titanium and nickel. Some examples of metal alloys from which perforated sheet 98 may be made include aluminum alloys, steel, nickel alloys and titanium alloys, such as series 2000, 6000 or 7000 aluminum, 300 and 400 series stainless steels, precipitation hardenable stainless steels, Ti-6Al-4V, Ti-6Al-2Sn-4Zr-2Mo, WASPALOY®, INCONEL 718®, INCONEL 718+®, INCONEL 939® or HAYNES 282®.

The perforated sheet 98 may be manufactured separately from the supports 80. In this instance, the perforated sheet 98 may be adhered to the second end 84 of the support 80. The adhesives that may be used to bond the perforated sheet 98 to the support 80 in this instance may be epoxy resins, including but not limited to, includes bisphenol A resins, bisphenol F resins, novolac resins, aliphatic epoxy resins and glycidylamine resins. Alternatively, if the support 80 is manufactured from thermoplastic, then the perforated sheet 98 may be adhered to the support 80 by thermal melting in a process analogous to the thermal melting technique described above to attach a stanchion 74 to a base sheet 72.

Figure 11:
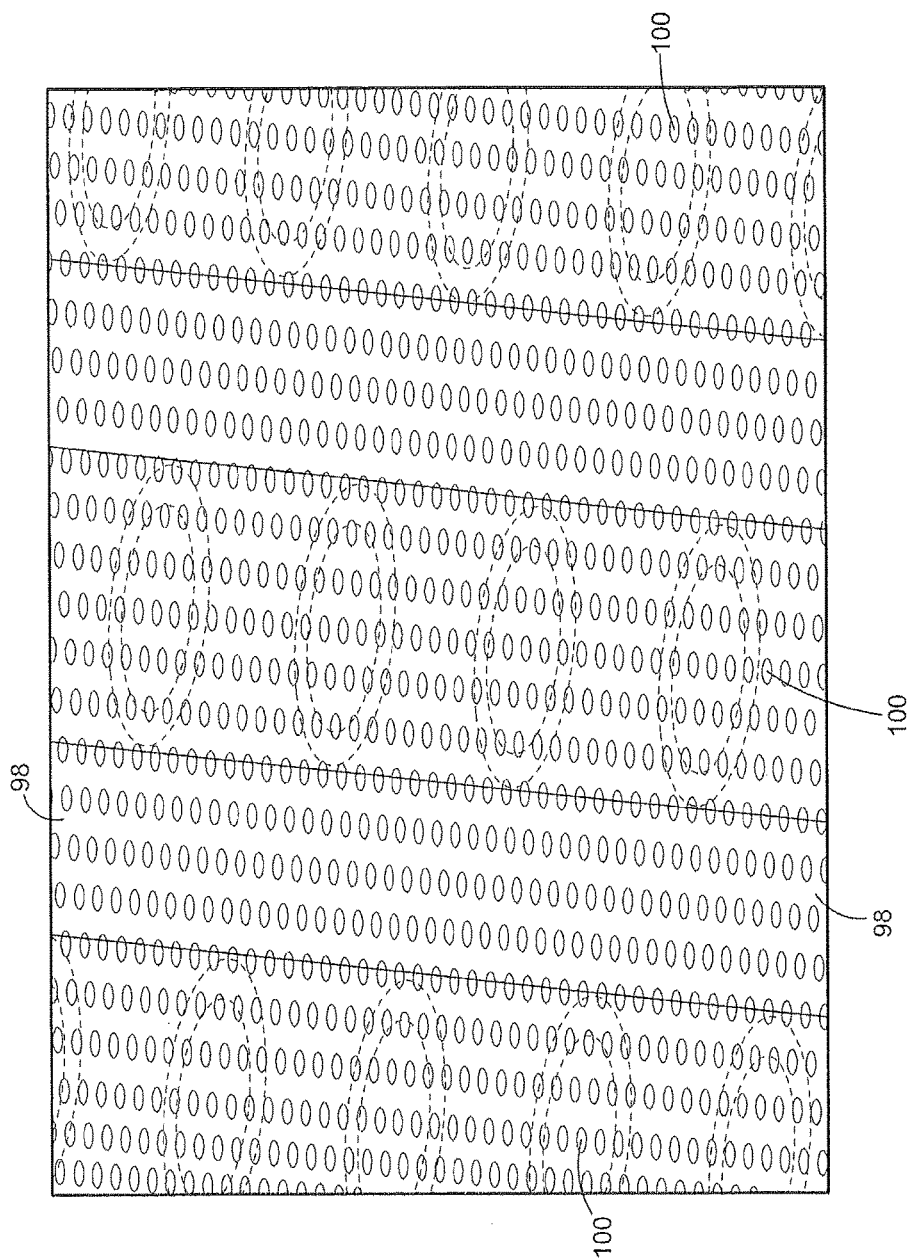
FIG. 11 is a magnified top-down view of a perforated sheet utilized in an impact liner manufactured in accordance with the present disclosure.

The perforated sheet 98 may further be characterized by its "percent open area." Percent open area is the ratio of hole area to total screen area at a 90° angle of incidence to the plane of the material, expressed as a percentage. Thus, material with forty percent open area will have forty square inches of openings 100 for every one hundred square inches of material. As is seen in FIG. 11, the perforated sheet 98 comprises percent open area. In one instance, the percent open area of the perforated sheet 98 may be between about 1 percent and about 25 percent. In another instantiation, the perforated sheet 98 has a percent open area between about 3 percent and about 15 percent. In a further example, the perforated sheet 98 comprises a percent open area between about 6 percent and about 12 percent.

Figure 13:
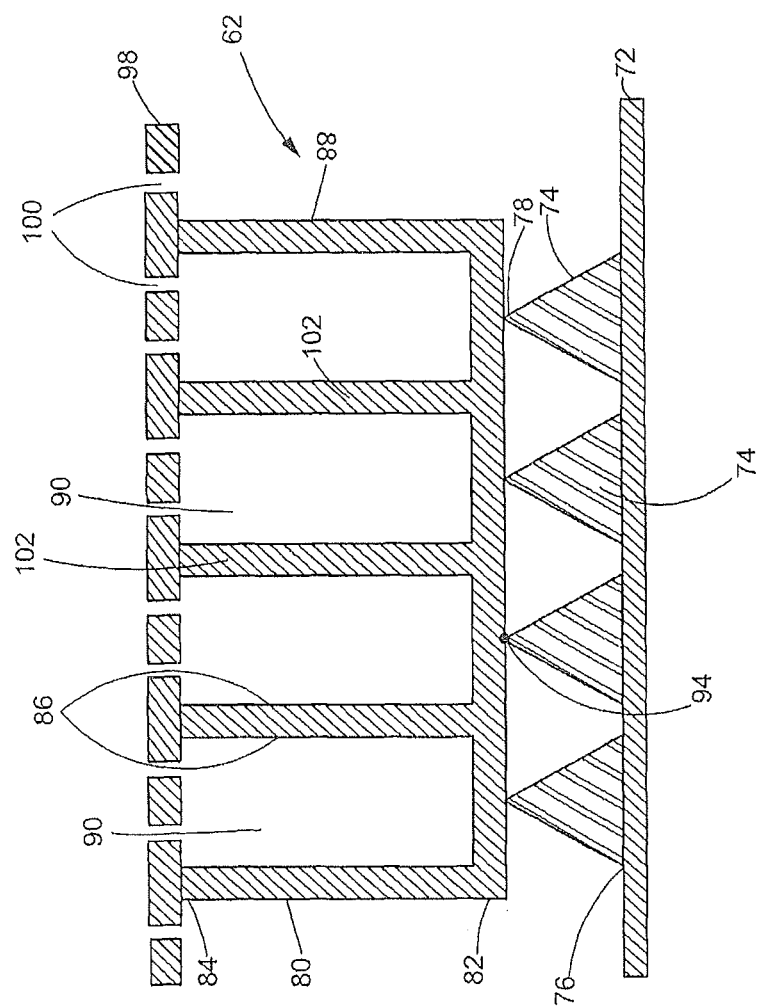
FIG. 13 is a cross-sectional view of another instantiation of an impact liner manufactured in accordance with the present disclosure in the direction of I-I of FIG. 4.

In order maximize the noise attenuation capability of an impact liner 62 disclosed herein the area density of the chamber 90 may be increased. This may be accomplished by having neighboring chambers 90 of the supports 80 share at least one wall 100, as is depicted in FIG. 13. As shown there, the impact liner may include a base sheet 72, and a plurality of stanchions 74 may extend from the base sheet. The impact liner 62 may further include a support 80 coupled to the stanchions 74. Furthermore, the support 80 may include an inner wall 86 and an outer wall 88, and further define interior chambers 90. Moreover, neighboring chambers 90 may share at least one wall 102. The impact liner 62 may further include a perforated sheet 98 having openings 100 therethrough.

The above-described impact liner 62 may further be plated with a metal or metal alloy. The choice of the metal or metal alloy utilized may be dependent on the design conditions necessary, such as placement of such a liner 62 in hot or cooler zone of the gas turbine engine 20. Some examples of metals which may be used to plate the impact liner 62 include, but are not meant to be limited to, aluminum, titanium and nickel. Examples of metal alloys that may be used in plating an impact liner 62 manufactured in accordance with the present disclosure include, aluminum alloys, steel, nickel alloys and titanium alloys, such as series 2000, 6000 or 7000 aluminum, 300 and 400 series stainless steels, precipitation hardenable stainless steels, Ti-6Al-4V, Ti-6Al-2Sn-4Zr-2Mo, WASPALOY®, INCONEL 718®, INCONEL 718+®, INCONEL 939® or HAYNES 282®.

Figure 12A:
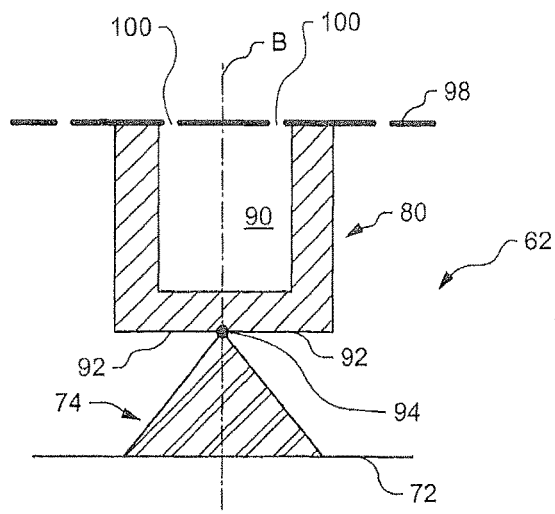
FIGS. 12a-12c are side, cross-sectional views depicting the operation of an impact liner manufactured in accordance with the present disclosure upon impact from a foreign object, such as ice.
Figure 12B:
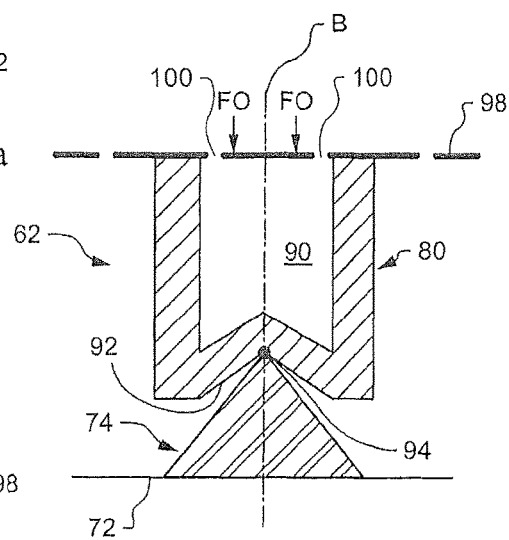
Figure 12C:
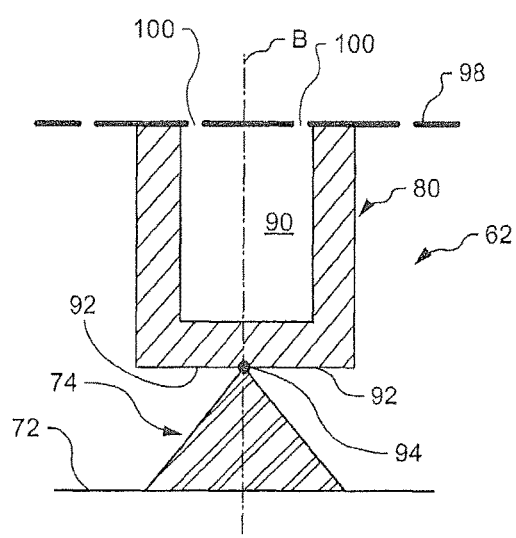

During use of an impact liner 62 disclosed herein a perforated sheet 98 may be coupled to a support 80 that is coupled to a stanchion 74 that is coupled to a base sheet 72. The support 80 may have chamber 90 and may be coupled to the stanchion 74 at the nodes 94 where the trusses 92 of the support 80 meet. Before impact of a foreign object, such as ice, noise may pass by the openings 100 in the perforated sheet 98 allowing the chamber 90 of the support 80 to act as a Helmholtz resonator, thereby attenuating sound passing by such a chamber. This configuration of the operation of an impact liner disclosed herein can be seen in FIG. 12a. Then, as is shown in FIG. 12b, subsequent to the impingement of a foreign object to the perforated sheet 98, the force (arrows labeled "FO") of the foreign object moves the perforated sheet 98 and the support 80 closer to the base sheet 72 while the node 94 remains in substantially the same location as before impact. This has the effect of dissipating the energy of the impact in the trusses 92 of the support 80. Once the energy of the impact has been dissipated, the trusses 92 may rebound and move the support 80 towards its starting position, as is depicted in FIG. 12c. However, if the energy of the impact is sufficient enough, then the support 80 may remain permanently deformed in a position analogous to FIG. 12b. In any event, whether before or after impact of a foreign object such as ice, the chamber 90 of the impact liner 62 may act as a Helmholtz resonator thereby attenuating engine noise passing by such chamber.

Figure 14:
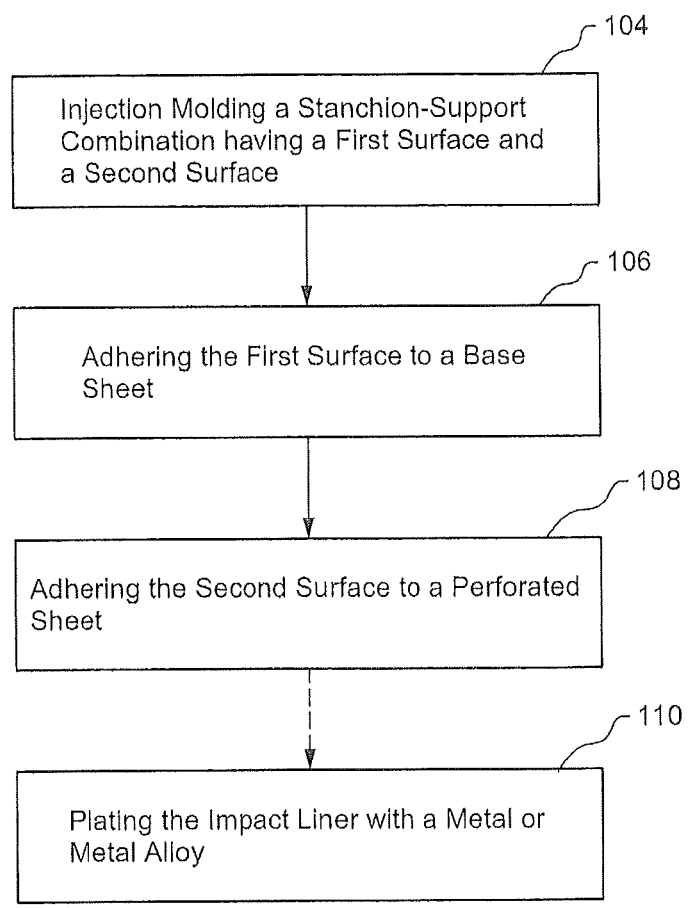
FIG. 14 is a flowchart depicting a sample sequence of steps which may be practiced in accordance with a method of manufacturing an impact liner of the present disclosure.

While the foregoing describes a gas turbine engine 20 and an impact liner 62, the present disclosure also recites methods for making an impact liner. An embodiment of the method is depicted in the flowchart in FIG. 14. As shown in this chart, the method may include a first step 104 of injection molding a stanchion-chamber combination 96 having a first surface and a second surface opposed to the first surface. The first surface would be associated with the first side of the stanchions described above, while the second surface would be associated second end of the chambers described before. Then, in a second step 106, the first surface is adhered to a base sheet. Next, the second surface may be adhered to a perforated sheet 108. As would be apparent to a person of skill in the art, the order of steps 106 and 108 may be interchanged. In an additional, although not necessary, step 110 the impact liner may be plated with a metal or metal alloy.

The stanchion-chamber combination may be comprised of a thermoplastic material, such as acrylic, nylon, polybenzimidazole, polyethylene, polypropylene, polystyrene, polyvinyl chloride, polytetrafluoroethylene and combinations thereof. Furthermore, the base sheet may be manufactured by a variety of additive manufacturing processes. In one example, electron beam melting may be utilized. Electron beam melting is a process where a metal or metal alloy powder is melted with an electron beam in a layer-by-layer additive process. Thus, a layer of metal or metal alloy (e.g., titanium or titanium alloy) may be deposited onto the engine casing, and then an electron beam is utilized to melt the material to the casing. In another example, electron beam wire deposition may be utilized to deposit the base sheet onto the casing. In electron beam wire deposition a wire made of metal or metal alloy (e.g., titanium, titanium alloys, nickel or nickel alloy) is continuously fed into the path of an electron beam that is in close physical proximity to the casing, thereby melting the material onto the casing. The beam and wire combination may be moved in the X, Y or Z planes to create the ring in an additive process.

In a further example, direct metal laser sintering may be used to deposit the base sheet onto the casing. In direct metal laser sintering, a metal or metal alloy powder is sintered together with a laser beam in a layer-by-layer additive process. Thus, a layer of metal or metal alloy (e.g., titanium, titanium alloy, nickel or nickel alloy) may be deposited onto the casing, and then the laser is utilized to coalesce and sinter together the metal or metal alloy powders. In a close cousin to direct metal laser, selective laser sintering may also be used to deposit the ring. In selective laser sintering, a granular bed of metal or metal alloy powder (e.g., titanium, titanium alloy, nickel or nickel alloy), and then a laser is used to selectively fuse the powder together. Then, another layer of powder is added and the process is repeated. Selective laser melting may also be used. In selective maser melting, which is similar to selective laser sintering, a granular bed of metal or metal alloy powder (e.g., titanium, titanium alloy, nickel or nickel alloy), is laid down then a laser is used to melt, rather than fuse, the powder granules together. Then, another layer of powder is added and the process is repeated. In another cousin to direct metal laser sintering, laser beam powder deposition may be used. Laser beam powder deposition is a process in which metal powder is injected into the focused beam of a high-power laser under tightly controlled atmospheric conditions. The focused laser beam melts the surface of the target material and generates a small molten pool of based material. The powder delivered to this spot is absorbed into the melt pool, thus generating a deposit thereby building a feature.

Next, cold metal transfer may be used to construct the base sheet. The cold metal transfer process is an engineered cousin of arc welding in which a filler metal repeatedly moves into and out of a weld pool. Moving the filler metal into the weld pool extinguishes the arc between the filler metal and the substrate, while moving the filler metal out of the pool regenerates the arc thereby melting more fill material for addition to the melt pool. Cold metal transfer is a gas metal arc welding (GMAW) process where the filler metal moves into and out of the weld pool, repeatedly forming and extinguishing the arc.

Additionally, gas dynamic cold spraying may be used to deposit the base sheet onto the casing. In gas dynamic cold spraying, metal or metal alloy powders are entrained in a high velocity gas stream, both of which then impinge the surface to be worked on. During impact with the surface the power particles undergo a plastic deformation and the particles adhere to the surface without any melting of the particles. Then, another layer of powder may be added to the previous layer. Heat treating may be used to improve the metallurgical bond between the powder and the casing, and between the powder particles themselves.

Finally, high velocity oxy-fuel coating spraying (HVOF) may be utilized to deposit the base sheet onto the casing. Like gas dynamic cold spraying, metal or metal alloy powders are entrained in a high velocity gas stream. However, in HVOF the gas stream is at an elevated temperature around the melting temperature of the powder. Thus, unlike gas dynamic cold spraying, the powder partially melts in the gas stream, and thus when the powder particles impinge the surface of the material to be worked upon, not only do the particles adhere due to plastic deformation, they also melt and fuse with the surface and with each other. Then, another layer of powder may be added to the previous layer.

The afore-described additive manufacturing processes may be also be utilized to form a perforated sheet in accordance with the present disclosure. However, in this instance, instead of being manufactured onto the casing, the perforated sheet would be additively manufactured onto a sacrificial layer, whether it is from the material used to make the perforated sheet or a purely sacrificial pre-formed material.

The base sheet and the perforated sheet may be comprised of metal or metal alloys. As described before, the metals that these sheets may be made from includes aluminum, titanium and nickel. The metal alloys from which these sheets may be comprised includes, but is not limited to, aluminum alloys, steel, nickel alloys and titanium alloys, such as series 2000, 6000 or 7000 aluminum, 300 and 400 series stainless steels, precipitation hardenable stainless steels, Ti-6Al-4V, Ti-6Al-2Sn-4Zr-2Mo, WASPALOY®, INCONEL 718®, INCONEL 718+®, INCONEL 939® or HAYNES 282®.

The stanchion-chamber combination may be adhered to the base sheet or the perforated sheet by thermal melting. In thermal melting a heat source is applied to the respective sheet. Then, the thermoplastic material may be contacted with the heated sheet. The sheet transfers heat energy to the thermoplastic material thereby raising its temperature at least to the melting temperature of the thermoplastic and bonds form between the sheet and the thermoplastic material. Then upon cooling, the thermoplastic material is bonded and adhered to the sheet.

Alternatively, the sheets may be adhered to the base sheet or perforated sheet with chemical adhesives. Some examples of chemical adhesives that may be used include epoxy resins. Epoxy resins that may be used to adhere the sheets to the stanchion-chamber combination includes bisphenol A resins, bisphenol F resins, novolac resins, aliphatic epoxy resins and glycidylamine resins.

INDUSTRIAL APPLICABILITY

In operation, the impact liner of the present disclosure can find applicability in many industrial settings including, but not limited to, gas turbine engines for use in aircraft. More specifically, various noise attenuating impact liners are disclosed. The impact liners disclosed herein have a base sheet, a plurality of stanchions extending from the base sheet, and a plurality of supports, each of the supports being operatively associated with one of the plurality of stanchions. The supports have chambers that act as Helmholtz resonators that attenuate noise that pass by such chambers. The supports further have trusses and sit atop the stanchions at nodes. The trusses allow for the absorption of energy from an impacting foreign object, such as ice. Thus, theses impact liners can replace non-noise attenuating impact liners in a gas turbine engine.

The above description is meant to be representative only, and thus modifications may be made to the embodiments described herein without departing from the scope of the disclosure. Thus, these modifications fall within the scope of present disclosure and are intended to fall within the appended claims.

What is claimed is:

1. An impact liner for a gas turbine engine, comprising:
   a base sheet;
   a perforated sheet spaced a distance from the base sheet;
   a plurality of stanchions extending from the base sheet; and
   a plurality of supports, each of the supports being operatively connected to one of the plurality of stanchions at a first end of the support, each support extending from a stanchion and coupled to the perforated sheet at a second end of the support opposite the first end, each support including a chamber formed therein interactive with the perforated sheet to act as a Helmholtz resonator.

2. The impact liner of claim 1, wherein the supports further include a plurality of trusses extending from an inner wall.

3. The impact liner of claim 1, wherein the supports further include nodes.

4. The impact liner of claim 2, wherein the supports further include nodes and wherein the trusses meet at the nodes.

5. The impact liner of claim 3, wherein the supports are coupled to the stanchions at the nodes.

6. The impact liner of claim 4, wherein the supports are coupled to the stanchions at the nodes.

7. A gas turbine engine, comprising:
   a compressor section;
   a combustor section downstream of the compressor section;
   a turbine section downstream of the combustor section; and
   a fan section upstream of the compressor section, the fan section including an impact liner, the impact liner including:
      a base sheet;
      a perforated sheet spaced a distance from the base sheet;
      a plurality of stanchions extending from the base sheet; and
      a plurality of supports, each of the supports being operatively connected to one of the plurality of stanchions at a first end of the support, each support extending from a stanchion and coupled to the perforated sheet at a second end of the support opposite the first end, each support including a chamber formed therein interactive with the perforated sheet to act as a Helmholtz resonator.

8. The gas turbine engine of claim 7, wherein the supports further include a plurality of trusses extending from an inner wall.

9. The gas turbine engine of claim 7, wherein the supports further include nodes.

10. The gas turbine engine of claim 8, wherein the supports further include nodes and wherein the trusses meet at the nodes.

11. The gas turbine engine of claim 9, wherein the supports are coupled to the stanchions at the nodes.

12. The gas turbine engine of claim 10, wherein the supports are coupled to the stanchions at the nodes.

13. A method for making an impact liner, comprising:
injection molding a stanchion-support combination, the stanchion-support combination having a first surface and a second surface and including:
    a plurality of stanchions extending from the base sheet; and
    a plurality of supports, each of the supports being operatively connected to one of the plurality of stanchions;
adhering the first surface to a base sheet;
adhering the second surface to a perforated sheet spaced a distance from the base sheet, each support of the stanchion-support combination including a chamber formed therein interactive with the perforated sheet to act as a Helmholtz resonator.

14. The method of claim 13, the stanchion-chamber combination being comprised of thermoplastic.

15. The method of claim 13, the base sheet being comprised of metal or metal alloy.

16. The method of claim 13 the perforated sheet being comprised of metal or metal alloy.

* * * * *